United States Patent
Maetz et al.

(10) Patent No.: US 9,230,119 B2
(45) Date of Patent: Jan. 5, 2016

(54) METHODS AND DEVICES FOR OPTIMIZING RENDERING OF AN ENCRYPTED 3D GRAPHICAL OBJECT

(71) Applicant: THOMSON LICENSING, Issy de Moulineaux (FR)

(72) Inventors: Yves Maetz, Melesse (FR); Marc Eluard, Saint-Malo (FR)

(73) Assignee: THOMSON LICENSING, Issy les Moulineaux (FR)

( * ) Notice: Subject to any disclaimer, the term of this patent is extended or adjusted under 35 U.S.C. 154(b) by 0 days.

(21) Appl. No.: 14/060,528

(22) Filed: Oct. 22, 2013

(65) Prior Publication Data
US 2014/0115345 A1    Apr. 24, 2014

(30) Foreign Application Priority Data

Oct. 23, 2012  (EP) .................................... 12306311

(51) Int. Cl.
| G06F 11/30 | (2006.01) |
| G06F 12/14 | (2006.01) |
| G06F 21/60 | (2013.01) |
| G09C 5/00 | (2006.01) |

(52) U.S. Cl.
CPC ............... *G06F 21/602* (2013.01); *G09C 5/00* (2013.01)

(58) Field of Classification Search
USPC ............................... 713/189–194; 726/26–33
See application file for complete search history.

(56) References Cited

U.S. PATENT DOCUMENTS 5,369,702 A * 11/1994 Shanton .......................... 713/166
6,201,881 B1 * 3/2001 Masuda et al. ................. 382/100
(Continued)

FOREIGN PATENT DOCUMENTS

| EP | 2400476 | 12/2011 |
| EP | 2453430 | 5/2012 |

(Continued)

OTHER PUBLICATIONS

Jiping Li; Lin Fan; Jianjun Peng; Jiang Du; Lu Sun, "Top-down quad mesh generation for multi-level product data visualization," System Science, Engineering Design and Manufacturing Informatization (ICSEM), 2011 International Conference on , vol. 1, No., pp. 211,214, Oct. 22-23, 2011 doi: 10.1109/ICSSEM.2011.6081186.*
C.D. Cera, T. Kim, J. Han, W.C. Regli; "Role-based viewing envelopes for information protection in collaborative modeling," Comput Aided Des, 36 (9) (2004), pp. 873-886.*

(Continued)

*Primary Examiner* — Dede Zecher
*Assistant Examiner* — Vadim Savenkov
(74) *Attorney, Agent, or Firm* — Tutunjian & Bitetto, P.C.

(57) ABSTRACT

The graphical characteristics of 3D graphical objects encrypted using format-preserving encryption makes rendering of such objects quite inefficient by non-authorized devices. To optimize the rendering of a three-dimensional graphical object represented by a list of points and a list of surfaces defined by points in the list of points, a device receives the graphical object; encrypts the graphical object using a format-preserving encryption method to obtain an encrypted graphical object; encapsulates the encrypted graphical object to obtain an encapsulated graphical object by adding at least one encapsulation by adding for each encapsulation, to the list of surfaces, a plurality of surfaces that together enclose the encrypted graphical object and, in an embodiment, at least one point to the list of points; and outputs the encapsulated graphical object. Decryption is performed by essentially reversing the encryption.

30 Claims, 1 Drawing Sheet

(56) References Cited

U.S. PATENT DOCUMENTS

| | | | |
|---|---|---|---|
| 6,678,378 B1* | 1/2004 | Akiyoshi | 380/54 |
| 6,895,555 B1 | 5/2005 | Ando | |
| 7,159,112 B1* | 1/2007 | Williams | 713/168 |
| 2003/0071810 A1* | 4/2003 | Shoov et al. | 345/420 |
| 2007/0196030 A1* | 8/2007 | Grimaud et al. | 382/276 |
| 2008/0022408 A1* | 1/2008 | Phelps | 726/26 |
| 2011/0055583 A1 | 3/2011 | Phelps | |
| 2012/0014614 A1 | 1/2012 | Takahashi et al. | |

FOREIGN PATENT DOCUMENTS

| | | |
|---|---|---|
| EP | 2528267 | 11/2012 |
| EP | 2568463 | 3/2013 |
| JP | 2012023662 | 2/2012 |
| WO | WO2012000898 | 1/2012 |

OTHER PUBLICATIONS

Chih-Hsing Chu, Ping-Han Wu, Yu-Chiung Hsu, "Multi-agent collaborative 3D design with geometric model at different levels of detail, Robotics and Computer-Integrated Manufacturing," vol. 25, Issue 2, Apr. 2009, pp. 334-347, ISSN 0736-5845, http://dx.doi.org/10.1016/j.rcim.2007.01.005.*

Acera C D et al: "Role-based viewing envelopes for information protection incollaborative modeling",Computer Aided Design, Elsevier Publishers BV., Barking, GB, vol. 36, No. 9, Aug. 1, 2004, pp. 873-886, XP004511139.

Search Report Dated Apr. 19, 2013.

Bennour et al., "Protection of 3D Object Visual Representations", 2006 IEEE International Conference on Multimedia and Expo, Jul. 9, 2006, pp. 1113-1116.

El Sheh et al., "Secret Sharing Approaches for 3D Object Encryption", Expert Systems with Applications, vol. 38, No. 11, Oct. 2011, pp. 13906-13911.

* cited by examiner

METHODS AND DEVICES FOR OPTIMIZING RENDERING OF AN ENCRYPTED 3D GRAPHICAL OBJECT

This application claims the benefit, under 35 U.S.C. §119 of European Patent Application 12306311.7, filed Oct. 23, 2012.

TECHNICAL FIELD

The present invention relates generally to 3-D models and in particular to the protection of graphical objects of such models.

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

The use of three-dimensional (3D) graphical objects has been increasing in the last years, particularly with the emergence of metaverses. There are multiple usages for 3D objects: socializing worlds, games, mirroring worlds, simulation tools, but also 3D User interfaces, animation movies and visual effects for television. Generally, 3D virtual objects represent real money value. In socializing worlds and games, players are selling virtual objects or avatars to other players for real money. Building an experienced character within an online game is a very lengthy process that can require hundreds of hours behind the keyboard. The 3D model of a real-world object from a simulation tool allows manufacturing the real (counterfeit) object and selling it. Leaking the 3D model for a scene of the next blockbuster from Hollywood studios may result in bad press for the studios. As can be seen, in many cases, 3D objects are assets of great value for their owner.

For this reason, various strategies for encryption of 3D objects have been invented. In general, such methods take a 3D object, encrypt the 3D object by modifying some of the parameters, and output an encrypted 3D object that in many cases appears more or less random.

A first example of such encryption is described in WO 2012/000898 (also published as EP 2400476) in which a 3D object comprising a list of nodes and a list of lines or surfaces defined by the nodes. To encrypt the 3D object, the values of the nodes is shuffled. As the surfaces now are defined by other node values, the encrypted 3D object usually becomes quite random and 'chaotic'.

A second example, described in EP 2453430, improves on the first example in that at least the node values of one dimension is shuffled independently of the node values of the other dimensions. Once again, the encrypted 3D object usually becomes quite random and 'chaotic'.

In a third example, described in EP 11306116.2, a bit stream representing a 3D object can be encrypted and the encrypted bit stream can be interpreted as points of a further 3D object. The skilled person will appreciate that the encryption usually renders the points random and thus the further 3D object 'chaotic'.

In a fourth example, described in EP 12168218.1, a 3D object is encrypted by generating pseudo-random vectors that are added to the original points of the 3D object. Since the vectors can be made to go in any direction, the encrypted 3D object can be quite random.

The skilled person will appreciate that the encrypted 3D objects can be rendered by a rendering device. It will also be appreciated that the geometric properties of encrypted 3D objects are different from the original 3D objects. In particular:
- the basic surface (typically triangles) in an encrypted 3D object is generally significantly larger than the surface of the original object; and
- the number of overlapped surfaces is significantly greater than in the original object.

Since the rendering of 3D objects and environments makes use of rasterization, which is optimized for the usual geometry properties of 3D objects, the rendering performances of encrypted 3D objects can be highly impacted, specially the time spent in rasterization. One reason for this is that a standard renderer renders surfaces of encrypted 3D objects that, later during the rendering of the protected 3D object, are hidden by one or more further surfaces.

It will therefore be appreciated that there is a need for a system that improves the rendering of encrypted 3D objects by optimizing the time spent in rasterization without compromising the security of the encrypted 3D objects. The present invention provides at least such a system.

SUMMARY OF INVENTION

In a first aspect, the invention is directed to a device for decrypting an encapsulated three-dimensional graphical object comprising an encrypted three-dimensional graphical object and at least one encapsulation that are represented by a list of points and a list of surfaces defined by points in the list of points, the at least one encapsulation comprising a plurality of surfaces that enclose the encrypted three-dimensional graphical object, wherein the encrypted three-dimensional graphical object has been encrypted using a format-preserving encryption method. The device comprises a processor configured to: receive the encapsulated three-dimensional graphical object; remove the encapsulation to obtain the encrypted three-dimensional graphical object by removing the surfaces of the encapsulation from the list of surfaces; decrypt the encrypted three-dimensional graphical object to obtain an unencrypted three-dimensional graphical object; and output the unencrypted three-dimensional graphical object.

In a first preferred embodiment, the processor is further configured to receive a number indicative of the number of surfaces that make up an encapsulation.

In a second preferred embodiment, each surface of the encapsulation is defined using at least one point added to the encrypted three-dimensional graphical object. The processor is further configured to receive a number indicative of the number of points added to the encrypted three-dimensional graphical object and to remove each point added to the encrypted three-dimensional graphical object.

In a third preferred embodiment, in the list of surfaces, the surfaces of the encapsulation and the surfaces of the encrypted three-dimensional graphical object are separated by a null surface defined using a single point, and the processor is further configured to find the null surface so as to determine the surfaces of the encapsulation and to remove also the null surface. It is advantageous that the surfaces of the encapsulation are located, in the list of surfaces, between the null surface and a further null surface, and that the processor is configured to remove also the further null surface.

In a fourth preferred embodiment, the processor is configured to remove the plurality of surfaces of the encapsulation from at least one of the beginning of the list of surfaces and the end of the list of surfaces.

In a second aspect, the invention is directed to a method of decrypting an encapsulated graphical object comprising an encrypted graphical object and at least one encapsulation that are represented by a list of points and a list of surfaces defined by points in the list of points, the at least one encapsulation comprising a plurality of surfaces that enclose the encrypted graphical object, wherein the encrypted graphical object has been encrypted using a format-preserving encryption method. A device receives the encapsulated graphical object; removes the encapsulation to obtain the encrypted graphical object by removing the surfaces of the encapsulation from the list of surfaces; decrypts the encrypted graphical object to obtain a non-encrypted graphical object; and outputs the non-encrypted graphical object.

In a first preferred embodiment, the device further receives a number indicative of the number of surfaces that make up an encapsulation.

In a second preferred embodiment, in the list of surfaces, the surfaces of the encapsulation and the surfaces of the encrypted object are separated by a null surface defined using a single point, and the device further finds the null surface so as to determine the surfaces of the encapsulation and removes also the null surface.

In a third aspect, the invention is directed to a device for encrypting a three-dimensional graphical object represented by a list of points and a list of surfaces defined by points in the list of points. The device comprising a processor configured to: receive the graphical object; encrypt the graphical object using a format-preserving encryption method to obtain an encrypted graphical object; encapsulate the encrypted graphical object to obtain an encapsulated graphical object by adding at least one encapsulation by adding for each encapsulation, to the list of surfaces, a plurality of surfaces that together enclose the encrypted graphical object; and output the encapsulated graphical object.

In a first preferred embodiment, the processor is further configured to output a number indicative of the number of surfaces that make up an encapsulation or a number indicative of the number of points added to the encrypted graphical object.

In a second preferred embodiment, the processor is configured to insert, in the list of points of the encrypted graphical object, at least one point used to define the surfaces of the encapsulation, and to output a number indicative of the added number of points.

In a fourth aspect, the invention is directed to a method of encrypting a three-dimensional graphical object represented by a list of points and a list of surfaces defined by points in the list of points. A device receives the graphical object; encrypts the graphical object using a format-preserving encryption method to obtain an encrypted graphical object; encapsulates the encrypted graphical object to obtain an encapsulated graphical object by adding at least one encapsulation by adding for each encapsulation, to the list of surfaces, a plurality of surfaces that together enclose the encrypted graphical object; and outputs the encapsulated graphical object.

In a fifth aspect, the invention is directed to a computable readable storage medium comprising stored instructions that when executed by a processor performs the method of the second aspect.

In a sixth aspect, the invention is directed to a computable readable storage medium comprising stored instructions that when executed by a processor performs the method of the fourth aspect.

BRIEF DESCRIPTION OF DRAWINGS

Preferred features of the present invention will now be described, by way of non-limiting example, with reference to the accompanying drawings, in which.

DESCRIPTION OF EMBODIMENTS

In some 3D content formats, such as for example Virtual Reality Modelling Language (VRML) and X3D, a 3D graphical object ("3D object") is represented as a first list (or array) of points and a second list with information on how to link the points together. Such 3D content formats are suitable for the exemplary encryption schemes described in the background section.

As has been mentioned herein, rasterization of encrypted 3D objects, in particular those for which the geometric properties have been modified, is inefficient. In particular, the z-buffer, i.e. the depth buffer, is inefficient since surfaces that later are hidden by other surfaces nevertheless are rendered.

A main idea of the present invention is thus to add surfaces to the encrypted 3D object in order to optimize the time spent during rasterization, without compromising the security of the encrypted 3D object. The general principle is to add a "box", defined by a set of points and a set of surfaces, that encapsulates (hides) the protected object and that has the usual geometric properties for the rasterization, i.e. generally the geometric properties for which rasterization is optimized.

The "box" is an additional shape that can take several forms, from a parallelepiped that corresponds to the bounding box of the encrypted 3D object to a convex hull that can be more or less "tight" around the encrypted 3D object. In the latter case, it is for example possible to generate surfaces defined by a number of extreme points (e.g. the two points having the lowest and highest value for each dimension), determine if any other points extend beyond any of these surfaces and, if so, subdivide any such surface taking into account the extending point or points. However, the exact mechanics of the computation of this "box" goes beyond the scope of the invention. As will be understood, the addition of the "box" requires the addition of new surfaces and may also, in some cases, require the addition of new points.

Figure 1:
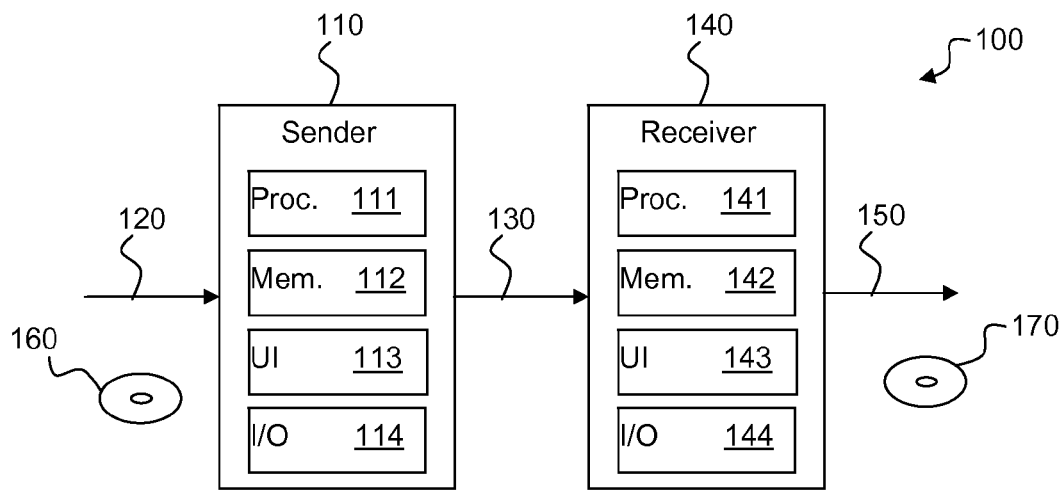
FIG. 1 illustrates a system for encapsulating and decapsulating a 3D object according to a preferred embodiment of the present invention.
Figure 2:
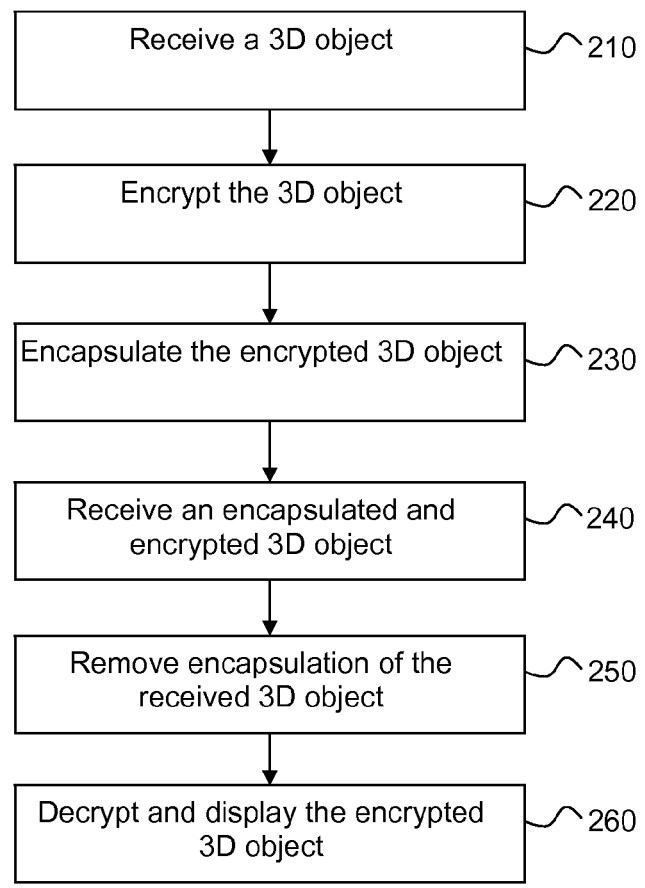
FIG. 2 illustrates a general method for encapsulating and decapsulating a 3D object according to the present invention.

FIG. 1 illustrates a system 100 for encapsulating and decapsulating a 3D object according to a preferred embodiment of the present invention and FIG. 2 illustrates a general method for encapsulating and decapsulating a 3D object according to the present invention. As a non-limitative example, a first list comprises points corresponding to the vertices of the surfaces composing the graphical object and are expressed in 3D coordinates, and the second list comprises information on how to link the vertices together to form lines and surfaces.

The system 100 comprises a sender 110 and a receiver 140, each comprising at least one processor 111, 141, memory 112, 142, preferably a user interface 113, 143, and at least one input/output unit 114, 144. The sender 110 may for example be a personal computer or a workstation, while the receiver 120 for example may not only be a personal computer or a workstation, but also a television set, a video recorder, a set-top box or the like.

A first computable readable storage medium 160 comprises stored instructions that when executed by the processor 111 of the sender 110 performs the encapsulation method of any one of the preferred embodiments described herein. A second computable readable storage medium 170 comprises stored instructions that when executed by the processor 141 of the receiver 140 performs the decapsulation method of any one of the preferred embodiments described herein.

The sender 110 receives 210 a 3D object 120 to be encrypted and encrypts 220 the 3D object 120 using any suitable encryption method that generates an encrypted 3D object that may be rendered by a receiver that does not have the necessary decryption capability; put another way, the encryption method is format preserving. The sender 110 then encapsulates 230 the encrypted 3D object, preferably using any suitable encapsulation method described herein, and outputs the encapsulated 3D object 130, for example by storing it or by sending it to the receiver 140.

The receiver 140 receives 240 the encapsulated 3D object 130, e.g. directly from the sender 110 or from a storage medium. In case the receiver 140 does not have the requisite decryption rights, the receiver 140 may nevertheless display the encapsulated 3D object 130, thus effectively displaying the "box". On the other hand, in case the receiver 140 does have the requisite decryption rights, it removes 250 the encapsulation, decrypts 260 the encrypted 3D object to obtain a decrypted 3D object 150 that may then be output 260, e.g. displayed or otherwise used. It should be noted that the initial 3D object 120 and the decrypted 3D object 150 normally are identical.

It will be appreciated that most rendering devices do not render "hidden" surfaces, i.e. surfaces that appear behind another surface. Since the "box" effectively hides all the other surfaces of the encapsulated 3D object, there is no need to render any other surfaces. This can greatly improve the rendering efficiency of an encapsulated 3D object.

It will further be appreciated that it is preferred that the encapsulation of the encrypted 3D object is made part of the encrypted 3D object. A number of preferred embodiments for combining the "box" and the encrypted 3D object are provided hereinafter. To be compliant with the protection techniques introduced in the prior art, the encrypted 3D object should not be modified and the encapsulation should be removed before applying the corresponding decryption techniques.

In the preferred embodiments, the geometry of an encrypted 3D object is, as a non-limitative example, represented as a set of points and a set of surfaces indexed on this set of points. The exemplary encrypted 3D object is defined by n points and m surfaces (each surface being defined by a plurality of points defined by index values) as follows:

| Points | | Surfaces | |
|---|---|---|---|
| 1 | | 1 | |
| ... | n points | ... | m surfaces, indexes 1 ... n |
| n | | m | |

First Preferred Embodiment: Added Surfaces Defined by Existing Points

In a first preferred embodiment, a number s surfaces are added to the 3D object 120. These new surfaces are defined using the existing points. This may be illustrated as follows:

| Points | | Surfaces | |
|---|---|---|---|
| 1 | | 1 | |
| ... | n points | ... | m surfaces, indexes 1 ... n |
| n | | m | |
| | | m + 1 | |
| | | ... | s surfaces, indexes 1 ... n |
| | | m + s | |

When providing the encapsulated object of the first preferred embodiment, it is necessary also to provide to the receiver the number s of added surfaces in order for the receiver to be able to remove the added surfaces during decapsulation. The number s may be sent using any suitable side channel, such as for example as metadata in the 3D object or in a specific field in a license linked to the 3D object.

Second Preferred Embodiment: Added Surfaces Defined by Added Points

In a second preferred embodiment, a number s surfaces defined using a set of p added points are added to the protected object, as follows:

| Points | | Surfaces | |
|---|---|---|---|
| 1 | | 1 | |
| ... | n points | ... | m surfaces, indexes 1 ... n |
| n | | m | |
| n + 1 | | m + 1 | |
| ... | p points | ... | s surfaces, indexes |
| n + p | | | n + 1 ... n + p |
| | | m + s | |

Naturally, it will be appreciated that it is possible to define some added surfaces using one or two initial points as long as at least one added point is used.

When providing the encapsulated object of the second preferred embodiment, it may also be necessary to provide to the receiver the number p of additional points to be able to retrieve the set of added surfaces. Indeed, the added surfaces are the only surfaces that use the added points (indices from n+1 to n+p). During decapsulation, the set of p points and the set of s surfaces are removed. As in the first preferred embodiment, any suitable side channel can be used to provide the value p. However, in case the bounding box is used to encapsulate the object, the receiver knows that six surfaces have been added, which makes decapsulation easy.

Third Preferred Embodiment: Using a Null Surface as a Tag

In the third preferred embodiment, s new surfaces defined using the existing points of the protected object are added and a "fake" surface, acting as a tag, is inserted to separate the original set of surfaces from the new surfaces. The fake surface is a null surface defined by the same point index for all its defining points (e.g. three for a triangle). In many cases, the receiver may easily detect this "fake" surface and thus extract the original surfaces.

However, some environments naturally produces this kind of null surfaces. In this variant, a new point is added so as to differentiate the added "fake" null surface from the natural null surfaces. This new point is added to the set of points of the encrypted object.

The resulting encapsulated object can be described as:

| Points | | Surfaces | |
|---|---|---|---|
| 1 | | 1 | |
| | n points | | m surfaces, indexes 1 ... n |

| Points | | Surfaces | |
|---|---|---|---|
| n | | m | |
| n + 1 | 1 point | m + 1 | 1 surface: (n + 1, n + 1, n + 1) |
| | | m + 2 | |
| | | | s surfaces, indexes 1 . . . n |
| | | m + s + 1 | |

When providing the encapsulated object of the third variant, it is not necessary to provide additional data, since the receiver easily can find the fake surface, and then remove the fake surface and the following s surfaces. However, in the second variant, the receiver should preferably remove the added point as well as the added surfaces.

First Variant

The preferred embodiments have the advantage of being easy for the sender since the initial points and surfaces are untouched. However, this may render the invention useless for unauthorized rendering devices (i.e. devices that will display the encapsulated object) if these devices render the surfaces as they appear in the surface list. Thus, in a first variant, the added points and surfaces are added to the beginning of the lists instead of at the end. Any rendering device that renders surfaces beginning at the start of the surface list will thus only render the "box" and not the "hidden" surfaces, as already mentioned.

Second Variant

The first variant works well for rendering devices that start the rendering from the top of the surface list. However, there are rendering device that start from the bottom of the surface and work upwards. For this reason, in the second variant the points and surfaces are added to the beginning of the lists as well as to the end. This way, it does not matter from which end the rendering begins.

Third Variant

In a third variant, new surfaces may be added in the middle of the surface list. This may be interesting in e.g. distributed processing environments where a processor is 'assigned' the rendering of a number of surfaces. Since the assigned surfaces are not necessarily the ones at the beginning or the end, the assigned surfaces may lie anywhere in the surface list; and hence the first two variants may not be effective.

In an attempt to at least partly remedy this, the third variant uses the same general principle as the third preferred embodiment, i.e. tags, the difference being that the set of added surfaces is delimited by a "start" tag and an "end" tag defined by fake null surfaces. This allows the distribution of the added surfaces over several sections (instead of in a single section), each section being delimited by tags and spread throughout the set of initial surfaces. It is however preferred to keep the added surfaces together, but the added surfaces may naturally be added more than once in the surface list in order to increase the chances that a processor finds an added surface early. The encapsulated 3D object may be illustrated as follows:

| Points | | Surfaces | |
|---|---|---|---|
| 1 | | 1 | |
| | n points | | k surfaces, indexes 1 . . . n |
| n | | k | |
| n + 1 | 1 point | k + 1 | 1 surface: (n + 1, n + 1, n + 1) |
| | | k + 2 | |
| | | | s surfaces, indexes 1 . . . n |
| | | k + s + 2 | |
| | | k + s + 3 | 1 surface: (n + 1, n + 1, n + 1) |
| | | k + s + 4 | |
| | | | m-k surfaces, indexes 1 . . . n |
| | | m + s + 4 | |

When providing the encapsulated object of the third variant, it is not necessary to provide additional data. Before the decryption, the receiver can easily find the tag pairs, remove the surfaces delimited by each tag pair as well as the tags. As in the third preferred embodiment, it may also be necessary to remove the added point.

It will be appreciated that the third variant works best for non-authorized rendering devices using distributed processing. An authorized rendering device should remove the added surfaces before decrypting the encrypted 3D object, after which rendering may be performed, with or without distributed processing. In other words, distributed processing may not be ideal for removing the added surfaces.

It will thus be appreciated that the present invention can provide a way of encapsulating an encrypted 3D object so that its rendering on an unauthorized rendering device is optimized, while also enabling decapsulation of the encrypted 3D object.

Each feature disclosed in the description and (where appropriate) the claims and drawings may be provided independently or in any appropriate combination. Features described as being implemented in hardware may also be implemented in software, and vice versa. Reference numerals appearing in the claims are by way of illustration only and shall have no limiting effect on the scope of the claims.

The invention claimed is:

1. A device for decrypting an encapsulated three-dimensional graphical object, comprising:
   a processor configured to receive an encrypted three-dimensional graphical object and at least one encapsulation that are represented by a list of points and a list of surfaces defined by points in the list of points, the at least one encapsulation comprising a plurality of surfaces that enclose the encrypted three-dimensional graphical object, wherein the encrypted three-dimensional graphical object has been encrypted using a format-preserving encryption method, the processor being further configured to:
   remove the encapsulation to obtain the encrypted three-dimensional graphical object by removing the surfaces of the encapsulation from the list of surfaces;
   decrypt the encrypted three-dimensional graphical object to obtain an unencrypted three-dimensional graphical object; and
   output the unencrypted three-dimensional graphical object.

2. The device of claim 1, wherein the processor is further configured to receive a number indicative of the number of surfaces that make up an encapsulation.

3. The device of claim 1, wherein each surface of the encapsulation is defined using at least one point added to the encrypted three-dimensional graphical object, and wherein the processor is further configured to receive a number indicative of the number of points added to the encrypted three-dimensional graphical object and to remove each point added to the encrypted three-dimensional graphical object.

4. The device of claim 1, wherein the surfaces of the encapsulation and the surfaces of the encrypted three-dimensional graphical object in the list of services are separated by a null surface defined using a single point, and wherein the processor is further configured to find the null surface so as to determine the surfaces of the encapsulation and to remove also the null surface.

5. The device of claim 4, wherein the surfaces of the encapsulation are located between the null surface and a further null surface in the list of surfaces, and wherein the processor is further configured to remove the further null surface.

6. The device of claim 1, wherein the processor is further configured to remove the plurality of surfaces of the encapsulation from at least one of the beginning of the list of surfaces and the end of the list of surfaces.

7. A method of decrypting an encapsulated three-dimensional graphical object, comprising:
receiving an encrypted three-dimensional graphical object and at least one encapsulation that are represented by a list of points and a list of surfaces defined by points in the list of points, the at least one encapsulation comprising a plurality of surfaces that enclose the encrypted three-dimensional graphical object, wherein the encrypted three-dimensional graphical object has been encrypted using a format-preserving encryption method;
removing the encapsulation to obtain the encrypted three-dimensional graphical object by removing the surfaces of the encapsulation from the list of surfaces;
decrypting the encrypted three-dimensional graphical object to obtain a non-encrypted three-dimensional graphical object; and
outputting the non-encrypted three-dimensional graphical object.

8. The method of claim 7, further comprising receiving a number indicative of the number of surfaces that make up an encapsulation or a number indicative of the number of points added to the encrypted three-dimensional graphical object.

9. The method of claim 7, wherein the surfaces of the encapsulation and the surfaces of the encrypted three-dimensional graphical object in the list of surfaces are separated by a null surface defined using a single point, the method further comprising finding the null surface to determine the surfaces of the encapsulation and to remove the null surface.

10. The method of claim 7, wherein each surface of the encapsulation is defined using at least one point added to the encrypted three-dimensional graphical object, and wherein the processor is further configured to receive a number indicative of the number of points added to the encrypted three-dimensional graphical object and to remove each point added to the encrypted three-dimensional graphical object.

11. The method of claim 7, wherein the plurality of surfaces of the encapsulation are removed from at least one of the beginning of the list of surfaces and the end of the list of surfaces using a processor.

12. The method of claim 9, wherein the surfaces of the encapsulation are located between the null surface and a further null surface in the list of services, and wherein the processor is further configured to remove the further null surface.

13. A method of encrypting a three-dimensional graphical object represented by a list of points and a list of surfaces defined by points in the list of points, comprising:
receiving the graphical object;
encrypting the graphical object using a format-preserving encryption method to obtain an encrypted graphical object;
encapsulating the encrypted graphical object to obtain an encapsulated graphical object by adding at least one encapsulation by adding a plurality of surfaces that together enclose the encrypted graphical object to the list of surfaces for each encapsulation; and
outputting the encapsulated graphical object.

14. The method of claim 13, further comprising inserting at least one point used to define the surfaces of the encapsulation in the list of points of the encrypted graphical object, and oputputting a number indicative of the added number of points.

15. A device for encrypting a three-dimensional graphical object represented by a list of points and a list of surfaces defined by points in the list of points, comprising:
a processor configured to:
receive the graphical object;
encrypt the graphical object using a format-preserving encryption method to obtain an encrypted graphical object;
encapsulate the encrypted graphical object to obtain an encapsulated graphical object by adding at least one encapsulation by adding a plurality of surfaces to the list of surfaces for each encapsulation that together enclose the encrypted graphical object; and
output the encapsulated graphical object.

16. The device of claim 15, wherein the processor is further configured to output a number indicative of the number of surfaces that make up an encapsulation.

17. The device of claim 15, wherein the processor is further configured to insert at least one point used to define the surfaces of the encapsulation in the list of points of the encrypted graphical object, and to output a number indicative of the added number of points.

18. The method of claim 13, further comprising outputting a number indicative of the number of surfaces that make up an encapsulation.

19. A non-transitory computable readable storage medium comprising stored instructions that when executed by a processor performs the method of claim 7.

20. A non-transitory computable readable storage medium comprising stored instructions that when executed by a processor performs the method of claim 13.

21. A device for decrypting an encapsulated three-dimensional graphical object, comprising:
means for receiving an encrypted three-dimensional graphical object and at least one encapsulation that are represented by a list of points and a list of surfaces defined by points in the list of points, the at least one encapsulation comprising a plurality of surfaces that enclose the encrypted three-dimensional graphical object, wherein the encrypted three-dimensional graphical object has been encrypted using a format-preserving encryption method;
means for removing the encapsulation to obtain the encrypted three-dimensional graphical object by removing the surfaces of the encapsulation from the list of surfaces;
means for decrypting the encrypted three-dimensional graphical object to obtain a non-encrypted three-dimensional graphical object; and
means for outputting the non-encrypted three-dimensional graphical object.

22. The device of claim 21, further comprising means for receiving a number indicative of the number of surfaces that make up an encapsulation or a number indicative of the number of points added to the encrypted three-dimensional graphical object.

23. The device of claim 21, wherein the surfaces of the encapsulation and the surfaces of the encrypted three-dimensional graphical object in the list of surfaces are separated by a null surface defined using a single point, the device further comprising means for finding the null surface to determine the surfaces of the encapsulation and to remove the null surface.

24. The device of claim 21, wherein each surface of the encapsulation is defined using at least one point added to the encrypted three-dimensional graphical object, and wherein the device includes means for receiving a number indicative of the number of points added to the encrypted three-dimensional graphical object and means for removing each point added to the encrypted three-dimensional graphical object.

25. The device of claim 23, wherein the surfaces of the encapsulation are located between the null surface and a further null surface in the list of surfaces, and the device further comprises means for removing the further null surface.

26. The device of claim 21, wherein the device further comprises means for removing the plurality of surfaces of the encapsulation from at least one of the beginning of the list of surfaces and the end of the list of surfaces using a processor.

27. A device for encrypting a three-dimensional graphical object represented by a list of points and a list of surfaces defined by points in the list of points, comprising:

means for receiving the graphical object;

means for encrypting the graphical object using a format-preserving encryption method to obtain an encrypted graphical object;

means for encapsulating the encrypted graphical object to obtain an encapsulated graphical object by adding at least one encapsulation by adding a plurality of surfaces to the list of surfaces for each encapsulation that together enclose the encrypted graphical object; and means for outputting the encapsulated graphical object.

28. The device of claim 27, further comprising means for storing and executing instructions using a non-transitory computer readable storage medium and a processor.

29. The device of claim 27, further comprising means for outputting a number indicative of the number of surfaces that make up an encapsulation.

30. The device of claim 27, further comprising means for inserting at least one point used to define the surfaces of the encapsulation in the list of points of the encrypted graphical object, and means for outputting a number indicative of the added number of points.

* * * * *